(12) United States Patent
Yang

(10) Patent No.: US 10,711,213 B2
(45) Date of Patent: Jul. 14, 2020

(54) METHOD AND SYSTEM FOR ENHANCING THE CARBON CONTENT OF CARBON-CONTAINING MATERIALS

(71) Applicant: Tsong-Jen Yang, Taichung (TW)

(72) Inventor: Tsong-Jen Yang, Taichung (TW)

( * ) Notice: Subject to any disclaimer, the term of this patent is extended or adjusted under 35 U.S.C. 154(b) by 59 days.

(21) Appl. No.: 15/678,572

(22) Filed: Aug. 16, 2017

(65) Prior Publication Data
US 2019/0055488 A1   Feb. 21, 2019

(51) Int. Cl.
| | | |
|---|---|---|
| *C10L 9/08* | (2006.01) | |
| *C10L 5/04* | (2006.01) | |
| *C10L 5/40* | (2006.01) | |
| *C10L 5/44* | (2006.01) | |

(52) U.S. Cl.
CPC .................... *C10L 9/08* (2013.01); *C10L 5/04* (2013.01); *C10L 5/406* (2013.01); *C10L 5/442* (2013.01); *C10L 5/445* (2013.01); *C10L 2200/0469* (2013.01); *C10L 2290/06* (2013.01); *C10L 2290/08* (2013.01); *C10L 2290/14* (2013.01); *C10L 2290/58* (2013.01); *C10L 2290/60* (2013.01)

(58) Field of Classification Search
CPC ....................................................... B61G 5/06
See application file for complete search history.

(56) References Cited

U.S. PATENT DOCUMENTS

2012/0285080 A1* 11/2012 Despen ................... C10B 49/02
44/500

FOREIGN PATENT DOCUMENTS

| CN | 1520450 A | 8/2004 |
|---|---|---|
| CN | 101880540 A | 11/2010 |
| CN | 102226095 A | 10/2011 |
| CN | 103328612 A | 9/2013 |
| CN | 104031665 A | 9/2014 |
| CN | 104087326 A | 10/2014 |
| CN | 104419492 A | 3/2015 |
| TW | 2014/00601 A | 1/2014 |
| WO | WO-94/08193 | 4/1994 |
| WO | WO-2012069448 A1 | 5/2012 |

OTHER PUBLICATIONS

Lindstrom; Table 34: General Chemical and Fuel Properties of a Range of Fossil Fuels (source Lindstrom 1980) (Year: 1980).*

(Continued)

*Primary Examiner* — Ellen M McAvoy
*Assistant Examiner* — Chantel L Graham
(74) *Attorney, Agent, or Firm* — Cesari and McKenna, LLP

(57) ABSTRACT

A method of enhancing the carbon content of a carbon-containing material, which includes loading a chamber with a carbon-containing material, evacuating air from the chamber, introducing an inert gas into the chamber, and heating sequentially the chamber at three or more different temperature phases each for a duration of time such that the weight percentage of the carbon in the treated carbon-containing material is increased by 20% or higher, as compared to the untreated carbon-containing material. Further disclosed is a system for performing this method.

20 Claims, 1 Drawing Sheet

(56) References Cited

OTHER PUBLICATIONS

"Coke (fuel)" Wikipedia, https://en.wikipedia.org/wiki/Coke_(fuel), retrieved from internet Aug. 28, 2017.
"Coke Production", IARC Monographs, 100F (2012) pp. 167-178.
"Diagram of Coke Production", OKK Koksovny, A.S., http://www.koksovny.cz/en/diagram-of-coke-production, retrieved from internet Aug. 28, 2017.
Valia, et al., "Coke Production for Blast Furnace Ironmaking" http://www.steel.org/making-steel/how-its-made/processes/processes-info/coke-production-for-blast-furnace-ironmaking.aspx, retrieved from internet Aug. 28, 2017.
Basso et al "Agro-Industrial Waste to Solid Biofuel Through Hydrothermal Carbonization" Waste Management vol. 47, pp. 114-121, 2016.
Bogale "Preparation of Charcoal Using Agricultural Wastes" Ethiopian Journal of Education and Sciences vol. 5, pp. 79-93, 2009.
Zubairu et al "Production and Characterization of Briquette Charcoal by Carbonization of Agro-Waste" Energy and Power vol. 4, pp. 41-47, 2014.

* cited by examiner

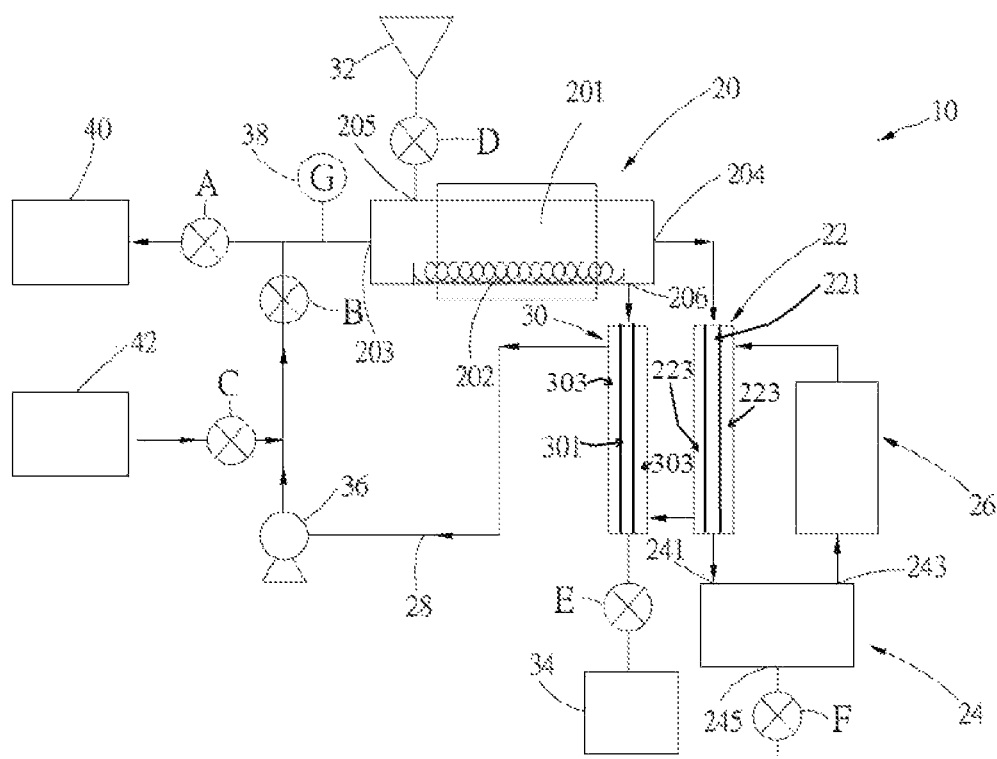

METHOD AND SYSTEM FOR ENHANCING THE CARBON CONTENT OF CARBON-CONTAINING MATERIALS

FIELD OF THE INVENTION

The present invention relates to enhancing the carbon content of carbon-containing materials.

BACKGROUND

Carbon-containing materials, e.g., coal, lignin waste materials, and rubber tire pellets, are used as solid fuel. They contain different amounts of carbon, sulfur, moisture, and volatile components, thereby generating various heat values and pollutants when burned.

In particular, coal, a naturally occurring carbon-containing material widely used in industry as a fuel source, is classified as peat, lignite, sub-bituminous coal, bituminous coal, or anthracite, each class having a quality from low to high. Untreated coal produces low heat values and high levels of air pollution after ignition. Thus, treatments during coal preparation, such as coal grinding, coal sieving, coal washing, coal drying, and coal mixing, are generally performed to increase heat values and lower levels of air pollution.

Conventional methods, aiming at enhancing the heat values of carbon-containing materials, encounter several major issues, e.g., operation at high pressures or temperatures and use of a complex system, which lead to high cost and low efficiency.

There is a need to develop a new method for enhancing the carbon contents of carbon-containing materials, thereby increasing their heat values.

SUMMARY

An aspect of the present invention is a method that significantly enhances the carbon content of a carbon-containing material, as well as its heat value.

More specifically, the method includes the following steps: (i) loading a chamber with a pre-determined amount of a carbon-containing material, (ii) evacuating air from the chamber to a pressure of 0.1 atm or lower, (iii) introducing an inert gas into the chamber to a pressure of 1-5 atm, (iv) heating the chamber to remove from the carbon-containing material moisture and volatile components to enhance the carbon content, and (v) cooling and collecting the carbon-containing material thus treated.

Importantly, the heating step is performed sequentially at three or more different temperature phases each for a duration of time such that the weight percentage of the carbon in the treated carbon-containing material is increased by 20% or higher, as compared to the untreated carbon-containing material. In other words, the heating process is controlled so that the three or more different temperature phases are carried out sequentially with the temperatures raised from low to high. Of note, the heating step can be controlled automatically (e.g., by computer) or manually. It is critical that the heating step is carried out under the protection of a flow of the inert gas kept at 1-5 atm. For each of the three or more temperature phases, one or more temperatures are held each for a pre-determined duration of time. For different carbon-containing materials, the heating process can be controlled differently respecting the temperature phases, the heating temperatures, and the heating durations.

The carbon-containing material can be coal, a carbon-containing lignin waste material, or rubber tire pellets. Examples of coal include sub-bituminous coal and lignite and examples of a carbon-containing lignin waste material include waste wood boards, wood chips, wood pellets, wood bricks, palm husks, and coconut husks.

The inert gas. e.g., nitrogen, argon, and helium, is usually introduced to the chamber to a pressure of 1-1.5 atm.

Also within the scope of this invention is a system for enhancing the carbon content of a carbon-containing material.

The system includes (1) a chamber containing a heating device, a material inlet, a material outlet, a gas inlet, and a gas outlet, in which the heating device is adoptable for heating sequentially the chamber at three or more different temperature phases each for a duration of time; (2) a material feeder connected to the material inlet for receiving a carbon-containing material to be conveyed to the chamber via the material inlet; (3) a cooling device for cooling the carbon-containing material conveyed from the chamber via the material outlet to a material storage tank for receiving the carbon-containing material; (4) a vacuum pump for removing air from the chamber, in which the vacuum pump is connected to the gas inlet; (5) a gas tank for providing an inert gas, in which the gas tank is also connected to the gas inlet; (6) a heat exchanger for separating a liquid from the inert gas, in which the heat exchanger is disposed between the gas outlet and a liquid storage tank for receiving the liquid; and (7) a pressure gauge for measuring pressure in the chamber.

Typically, the heating device is adoptable for heating the chamber to increase the temperature at a rate of 5-30° C./min.

In an exemplary system, the liquid storage tank contains an inlet, connected to the heat exchanger, via which the inert gas and the liquid from the heat exchanger pass through; and an outlet, connected to a gas purifier, via which the inert gas from the liquid storage tank passes through, wherein the inert gas is purified by the gas purifier.

The system can further contain a gas recycling device, disposed between the cooling device and the chamber, for returning the inert gas purified by the gas purifier to the chamber. The purified inert gas is conveyed from the gas purifier via both the heat exchanger and the cooling device to the gas recycling device before being returned to the chamber.

The details of the invention are set forth in the description below. Other features, objects, and advantages of the invention will be apparent from the following drawing and detailed description of several embodiments, and also from the appending claims.

BRIEF DESCRIPTION OF THE DRAWING

FIG. 1 is a schematic depiction of a system for enhancing the carbon content of a carbon-containing material.

DETAILED DESCRIPTION

First disclosed in detail herein is a system for enhancing the carbon content and heat value of a carbon-containing material.

Referring to FIG. 1, an embodiment of the system (10) includes a chamber (20), a heat exchanger (22), a liquid storage tank (24), a cooling device (30), a material feeder (32), a pressure gauge (38), a vacuum pump (40), a gas tank (42), and a plurality of valves A, B, C, D, E, and F. It further includes a gas purifier (26) and a gas recycling device (36).

As depicted in FIG. 1, the chamber (20) contains a heating house (201), a heating device (202; e.g., a furnace), a gas inlet (203), a gas outlet (204), a material inlet (205), and a material outlet (206), in which the heating device (202) is connected to the heating house (201) and is adoptable for heating the chamber at three or more different temperatures each for a duration of time.

The material feeder (32) is connected to the material inlet (205) for receiving a carbon-containing material to be conveyed to the chamber (20) via the material inlet (205). The chamber (20) can have a capacity of holding 1000 kg or more (e.g., 1500 kg and 2000 kg) of a carbon-containing material.

The cooling device (30), for cooling the carbon-containing material conveyed from the chamber (20), is disposed between the material outlet (206) and the material storage tank (34), which receives the cooled carbon-containing material. Of note, the cooling device (30) includes a hot compartment (301) and a cold compartment (303), in which the hot compartment (301) is connected to the material outlet (206) and the cold compartment (303) surrounds the hot compartment (301). Upon entering the hot compartment (301), the carbon-containing material is cooled via contact with the surrounding cold compartment (303).

The vacuum pump (40), for removing air from the chamber (20), is connected to the gas inlet (203).

The gas tank (42), for providing an inert gas into the chamber (20), is also connected to the gas inlet (203).

The pressure gauge (38), for measuring pressure in the chamber, is installed in a pipe connected to the gas inlet (203).

The heat exchanger (22), for separating a liquid from the inert gas, is disposed between the gas outlet (204) and the liquid storage tank (24), which receives the liquid. Note that the heat exchanger (22) includes a hot compartment (221) and a cold compartment (223), in which the hot compartment (221) is connected to the gas outlet (204) and the cold compartment (223) surrounds the hot compartment (221). Upon entering the hot compartment (221), the gas phase exiting the chamber (20) via the gas outlet (204) is cooled via contact with the surrounding cold compartment (223) so that a liquid is formed and separated from the inert gas.

The liquid storage tank (24), which stores the liquid thus formed, contains an inlet (241), via which the inert gas and the liquid from the heat exchanger (22) pass through, an outlet (243), via which the inert gas from the liquid storage tank (24) passes through, and a collecting opening (245), via which the liquid is removed from the liquid storage tank (24) and collected. Note that the inlet (241) is connected to the hot compartment (221) of the heat exchanger (22) and the outlet (243) is connected to the cold compartment (223) of the heat exchanger (22) via the gas purifier (26), which purifies the inert gas.

The gas recycling device (36), for returning the inert gas purified by the gas purifier (26) to the chamber (20), is disposed between the heat exchanger (22) and the chamber (20). The purified inert gas is conveyed from the gas purifier (26) via the heat exchanger (22) and the cooling device (30) to the gas recycling device (36).

Further disclosed in detail below is a method of enhancing the carbon content and thus the heat value of a carbon-containing material.

The method includes, among others, evacuating air from the chamber to a pressure of 0.1 atm or lower (e.g., 0.01-0.1 atm), introducing an inert gas into the chamber to a pressure of 1-5 atm (e.g., 1-1.2 atm, 1-1.5 atm, 1-2 atm, 1-3 atm, and 1-4 atm), and heating the chamber to remove from the carbon-containing material both moisture and volatile components to enhance the carbon content.

Again, the heating step is performed sequentially at three or more different temperature phases each for a duration of time such that the weight percentage of the carbon in the treated carbon-containing material is increased by 20% or higher, as compared to the untreated carbon-containing material. Preferably, the weight percentage of the carbon is increased by 25% or higher.

The heating process is typically controlled to increase the temperature at a rate of 5-30° C./min (e.g., 5° C./min, 10° C./min, 15° C./min, and 20° C./min).

By maintaining the heating rate, e.g., 5° C./min, the heating process is carried out in sequence to reach a first temperature phase, a second temperature phase, a third temperature phase, and so on. Note that for each of the three or more temperature phases, one or more temperatures are held each for a pre-determined duration of time. When two or more different temperatures are used during a temperature phase, each temperature can be held for the same duration of time for that temperature phase. As an example, for the first temperature phase, a temperature of 230° C. is held for 40 minutes; for the second temperature phase, temperatures of 280° C., 350° C., and 400° C. are each held for 30 minutes; and for the third temperature phase, a temperature of 550° C. is held for 60 minutes.

The carbon-containing material can be coal. In this case, the heating step includes sequentially holding the temperature at 200-240° C. for 35-45 minutes, holding the temperature at each of 260-300° C., 320-360° C., and 380-420° C. for 25-35 minutes, and holding the temperature at 550-900° C. (e.g., 550-650° C. and 600-700° C.) for 30-90 minutes. For example, while keeping the heating rate at 5° C./min, the heating step includes sequentially holding the temperature at 230° C. for 40 minutes, holding the temperature at each of 280° C., 350° C., and 400° C. for 30 minutes, and holding the temperature at 550° C. for 60 minutes. In another example, while keeping the heating rate at 5° C./min, the heating step includes sequentially holding the temperature at 230° C. for 40 minutes, holding the temperature at each of 280° C., 350° C., 400° C., and 550° C. for 30 minutes, and holding the temperature at 650° C. for 60 minutes.

The carbon-containing material can also be a carbon-containing lignin waste material selected from waste wood boards, wood chips, wood pellets, wood bricks, palm husks, and coconut husks. Differently, the heating step includes sequentially holding the temperature at 160-240° C. for 25-35 minutes, holding the temperature at each of 260-300° C. and 320-340° C. for 45-60 minutes, and holding the temperature at 360-500° C. for 25-60 minutes. For example, while keeping the heating rate at 5° C./min, the heating step includes sequentially holding the temperature at each of 180° C. and 230° C. for 30 minutes, holding the temperature at each of 280° C. and 330° C. for 60 minutes, and holding the temperature at 380° C. for 30 minutes.

The inert gas can be nitrogen, argon, helium, or a mixture thereof. It is typically introduced to the chamber to a pressure of 1-5 atm.

The above-described method can be performed using the system depicted in FIG. 1 in two stages, i.e., stage (a) and stage (b).

Stage (a) includes loading the chamber (20) with a carbon-containing material, evacuating the chamber, and introducing an inert gas into the chamber.

More specifically, stage (a) includes three steps, i.e., steps (a1)-(a3).

In step (a1), valve D is opened so that the carbon-containing material enters the chamber (20) from the material feeder (32) via the material inlet (205).

In step (a2), valves B, C, D. E. and F are closed, valve A is opened, and the air in the chamber (20) is removed with the vacuum pump (40) to keep the pressure therein 0.1 atm or lower (e.g., 0.01-0.1 atm).

In step (a3), valve A is closed and valves B and C are opened so that the inert gas flows from the gas tank (42) into the chamber (20) until the pressure inside the chamber (20) is equal to the atmospheric pressure or higher.

Stage (b) includes heating the carbon-containing material loaded in the chamber (20) at a pre-determined heating rate (e.g., 5° C./min) and sequentially holding at three or more different temperatures each for a duration of time, cooling and storing the treated carbon-containing material, and purifying and recycling the inert gas.

More specifically, stage (b) includes four steps. i.e., steps (b1)-(b4).

In step (b1), the carbon-containing material is heated by the heating device (202). Importantly, in this step, the temperature, the heating rate, and the holding of temperature are controlled, e.g., with a software, so that the temperature of the chamber (20) is raised from room temperature to a first temperature phase (e.g., 200-240° C.) and maintained for a duration of time (e.g., 35-45 minutes). Subsequently, the temperature of the chamber (20) is raised to a second temperature phase (e.g., 260-420° C.) and also maintained for a duration of time (e.g., 25-35 minutes). Finally, the temperature of the chamber (20) is raised to a third temperature phase (e.g., 550-900° C.) and again maintained for a duration of time (e.g., 30-90 minutes). Of note, the temperatures of the chamber (20) are not limited to the temperatures exemplified above. Depending on the type of the carbon-containing material, the temperatures can be controlled to different ranges as needed. By the same token, heating can be performed for different durations of time. Further, as pointed out above, more than three different temperature phases can be used.

When the carbon-containing material is heated to the first temperature phase, the moisture contained therein is gradually gasified into water vapor. As the temperature of the chamber (20) is raised to the second temperature phase, volatile components having low molecular weights, nitrogen, and sulfur are also gradually gasified. Finally, as the temperature of the chamber (20) is raised to the third temperature phase, covalent bonds between certain carbon atoms are broken and by-products having higher boiling points, e.g., coal tar, wood vinegar, and pyroligneous acid, are vaporized and separated from the treated carbon-containing material.

In step (b2), the treated carbon-containing material is conveyed into the material storage tank (34) via the hot compartment (301) of the cooling device (30) that is surrounded by the cold compartment (303).

In step (b3), the gas phase obtained from step (b1) enters the hot compartment (221) of the heat exchanger (22) and is cooled via contact with the surrounding cold compartment (223) so that a liquid is formed and separated from the inert gas. The liquid thus formed is conveyed into the liquid storage tank (24), together with the flow of the inert gas. As a result, the liquid is condensed by the heat exchanger (22) and separated from the inert gas. Both the liquid thus formed and the inert gas are conveyed into the liquid storage tank (24) via the inlet (241), in which the liquid is collected via the collecting opening (245) and the flowing inert gas is further conveyed into the gas purifier (26) via the outlet (243) to be purified.

In step (b4), the inert gas from the liquid storage tank (24) is purified and returned to the chamber. Upon entering into the gas purifier (26), the inert gas is purified by a carbon adsorbent disposed therein. Subsequently, the purified inert gas passes through the cold compartment (223) of the heat exchanger (22) and the cold compartment (303) of the cooling device (30), and returns to the chamber (0.20) via the pipe (28) and the gas recycling device (36), which conveys the purified inert gas to the chamber. Of note, to improve energy efficiency, the heat energy released from the gas phase during the above-described condensation process can be used for preheating the purified inert gas before it returns to the chamber (20). Similarly, the heat energy released from cooling the treated carbon-containing material can also be used for the same purpose.

Of note, the inner pressure of the chamber (20) in stage (b) is typically maintained at a pressure equal to or slightly higher than atmospheric pressure, allowing the chamber (20) to remain in communication with the connected pipes during operation. As such, the untreated carbon-containing material and the treated carbon-containing material can be easily conveyed, and the inert gas can flow readily throughout the system, thereby lowering the operation cost.

Furthermore, by heating the chamber (20) at three or more different temperature phases, the method of this invention readily allows separating the byproducts having different boiling points at different heating stages and collecting them in sequence in the liquid storage tank (24), thereby producing the treated carbon-containing material having a higher degree of purity, as compared to conventional methods.

In an embodiment of this method, the carbon-containing material is sub-bituminous coal or lignite; the inert gas is nitrogen or argon and is introduced to the chamber to a pressure of 1-1.5 atm; the heating process is controlled to increase temperature at 5-30° C./min; and the heating step includes sequentially holding the temperature at 200-240° C. for 35-45 minutes, holding the temperature at each of 260-300° C., 320-360° C., and 380-420° C. for 25-35 minutes, and holding the temperature at 550-900° C. (e.g., 550-650° C. and 600-700° C.) for 30-90 minutes.

In this embodiment, the untreated carbon-containing material has a carbon content of 50 wt % or lower, a sulfur content of 0.9 wt % or higher, and a heat value of 5000 kcal/kg or lower. The embodied method unexpectedly increases the carbon content and heat value of the carbon-containing material and lowers its sulfur content. More specifically, the treated carbon-containing material has a carbon content of 70 wt % or higher, a sulfur content of 0.4 wt % or lower, and a heat value of 7000 kcal/kg or higher.

Without further elaboration, it is believed that one skilled in the art can, based on the above description, utilize the present invention to its fullest extent. The following scaled-down examples are, therefore, to be construed as merely illustrative, and not limitative of the remainder of the disclosure in any way whatsoever.

Example 1: Process for Enhancing the Carbon-Content and Heat Value of Sub-Bituminous Coal The air in a chamber loaded with 8 kg of sub-bituminous coal was removed by a vacuum pump to keep the pressure in the chamber less than 0.1 atm. Inert gas $N_2$ was then introduced to the chamber to a pressure of 1 atm or slightly higher. The chamber was heated by a furnace under a flow of the inert gas at a heating rate of 5° C./min. The furnace was controlled to heat sequentially the chamber from room temperature to 230° C. and held at this temperature for 40 minutes, then the temperature was increased and held at each of 280° C., 350° C., and 400° C. for 30 minutes, and finally held at 550° C. for 60 minutes. Subsequently, the treated sub-bituminous coal was cooled to room temperature under a flow of the inert gas.

The material thus obtained was weighed and a weight loss of about 30% was determined. The analytical data for the untreated and treated sub-bituminous coal are listed in Table 1 below. The test and analysis were carried out by Society Generale de Surveillance (SGS) Taiwan Ltd. Note that the SGS analysis was performed following the protocols of the American Society for Testing and Materials (ASTM). For example, the heat value, ash content, and sulfur content were analyzed following protocols ASTM D5865, ASTM D3174, and ASTM D4239 (all incorporated herein by reference), respectively; and the total water content was analyzed following protocols ASTM D3302 and ASTM D3173 (both incorporated herein by reference). The same protocols were followed in EXAMPLES 2 and 3 below.

TABLE 1

Analytical data for untreated and treated sub-bituminous coal

| Coal | Untreated sub-bituminous coal[a] | Treated sub-bituminous coal[b] |
|---|---|---|
| Heat value (kcal/kg) | 5000 | AD 6932; DB 7091 |
| Total water content (wt %) | 28 | 2.24 AD |
| Ash content (wt %) | 8 | 10.26 AD |
| Sulfur content (wt %) | 0.9 | 0.37 AD |
| Carbon content (wt %) | 45.9 | 74.5 AD |

[a]Coal used for electric generation plant of Taipower Co. (Taiwan).
[b]AD denotes air dried basis and DB denotes dry basis, in which air dried basis refers to measurement with the carbon-containing material dried in equilibrium with humidity of air and dry basis refers to measurement with the carbon-containing material being anhydrous.

Unexpectedly, the treated sub-bituminous coal exhibited much higher heat value and carbon content and much lower sulfur content, as compared to the untreated sub-bituminous coal. More specifically, the treated sub-bituminous coal had a heat value of 6932 kcal/kg (AD) and 7091 kcal/kg (DB), a substantial increase from 5000 kcal/kg; a total water content of 2.24 wt % (AD), a decrease from 28 wt %; a sulfur content of 0.37 wt % (AD), a decrease from 0.9 wt %; and a carbon content of 74.5 wt % (AD), an increase from 45.9 wt %.

In particular, the process greatly increased the carbon content and heat value of sub-bituminous coal.

Example 2: Process for Enhancing the Carbon-Content and Heat Value of Lignite

The air in a chamber loaded with 8 kg of lignite was removed by a vacuum pump to keep the pressure in the chamber less than 0.1 atm. Inert gas Ar was then introduced to the chamber to a pressure of 1 atm or slightly higher. The chamber was heated by a furnace under a flow of the inert gas at a heating rate of 5° C./min. The furnace was controlled to heat sequentially the chamber from room temperature to 230° C. and held at this temperature for 40 minutes, then the temperature was increased and held at each of 280° C., 350° C., 400° C. and 550° C. for 30 minutes, and finally held at 650° C. for 60 minutes. Subsequently, the treated lignite was cooled to room temperature under a flow of the inert gas.

The material thus obtained was weighed and a weight loss of about 35% was determined. The analytical data for the untreated and treated lignite are listed in Table 2 below.

TABLE 2

Analytic data for untreated and treated lignite

| Coal | Untreated lignite[a] | Treated lignite[b] |
|---|---|---|
| Heat value (kcal/kg) | 4500 | AD 7506; DB 7606 |
| Total water content (wt %) | 29.3 | 1.32 AD |
| Ash content (wt %) | 1.9 | 8.26 AD |
| Sulfur content (wt %) | 1.2 | 0.34 AD |
| Carbon content (wt %) | 33.0 | 81.4 AD |

[a]Lignite used for coal-fired electric power plant in Taiwan
[b]Analyzed by SGS. AD denotes air dried basis and DB denotes dry basis.

Unexpectedly, the treated lignite exhibited much higher heat value and carbon content and much lower sulfur content, as compared to the untreated lignite. More specifically, the treated lignite had a heat value of 7506 kcal/kg (AD) and 7606 kcal/kg (DB), a substantial increase from 4500 kcal/kg; a total water content of 1.32 wt % (AD), a decrease from 29.3 wt %; a sulfur content of 0.34 wt % (AD), a decrease from 1.2 wt %; and a carbon content of 81.4 wt % (AD), an increase from 33 wt %.

In particular, the process greatly increased the carbon content and heat value of lignite.

Example 3: Process for Enhancing the Carbon-Content and Heat Value of Wood Pellets The air in a chamber loaded with 8 kg of wood pellets was removed by a vacuum pump to keep the pressure in the chamber less than 0.1 atm. Inert gas $N_2$ was then introduced to the chamber to a pressure of 1 atm or slightly higher. The chamber was heated by a furnace under a flow of the inert gas at a heating rate of 5° C./min. The furnace was controlled to heat sequentially the chamber from room temperature to 180° C. and held at this temperature for 30 minutes, then the temperature was increased and held at 230° C. for 30 minutes and at 280° C. and 330° C. each for 60 minutes, and finally held at 380° C. for 30 minutes. Subsequently, the treated wood pellets were cooled to room temperature under a flow of the inert gas.

The material thus obtained was weighed and a weight loss of about 30% was determined. The analytical data for the untreated and treated wood pellets are listed in Table 3 below.

TABLE 3

Analytic data for untreated and treated wood pellets

| Coal | Untreated wood pellets[a] | Treated wood pellets[b] |
|---|---|---|
| Heat value (kcal/kg) | 4800 | AD 7010; DB 7397 |
| Total water content (wt %) | nd | 5.23 AD |
| Ash content (wt %) | nd | 2.15 AD |
| Sulfur content (wt %) | nd | 0.02 AD |
| Carbon content (wt %) | nd | 77.1 AD |

[a]Commercially available materials from Chuenfa Green Tech. Co. (Taiwan) and nd denotes no data.
[b]Analyzed by SGS. AD denotes air dried basis and DB denotes dry basis.

Unexpectedly, the treated wood pellets exhibited much higher heat value, as compared to the untreated wood pellets. Indeed, the treated wood pellets had a heat value of 7010 kcal/kg (AD) and 7397 kcal/kg (DB), a substantial increase from 4800 kcal/kg of 7010 kcal/kg (AD mode) and 7397 kcal/kg (DB mode). Further, the treated wood pellets did not only have a high carbon content of 77.1 wt % (AD), but also an extremely low sulfur content of 0.02 wt % (AD).

These results indicate that the process greatly increased the carbon content and heat value of wood pellets.

OTHER EMBODIMENTS

All of the features disclosed in this specification may be combined in any combination. Each feature disclosed in this specification may be replaced by an alternative feature serving the same, equivalent or similar purpose. Thus, unless expressly stated otherwise, each feature disclosed is only an example of a series of equivalent or similar features.

From the above description, one skilled in the art can easily ascertain the essential characteristics of the present invention, and without departing from the spirit and scope thereof, can make various changes and modifications of the invention to adapt it to various usage and conditions. Thus, other embodiments are also within the scope of the following claims.

What is claimed is:

1. A method of enhancing the carbon content of a carbon-containing material, the method comprising:
    subjecting a pre-determined amount of a carbon-containing material to a vacuum pressure of 0.1 atm or lower,
    subjecting the carbon-containing material to an inert gas at a pressure of 1-5 atm,
    heating the carbon-containing material to remove moisture and volatile components therefrom to enhance the carbon content, and
    cooling and collecting the carbon-containing material thus treated, wherein the heating step is performed by sequentially heating the carbon-containing material to three or more different increasingly higher temperatures, each temperature being held for a predetermined duration of time such that the weight percentage of the carbon in the treated carbon-containing material is increased by 20% or higher, as compared to the untreated carbon-containing material.

2. The method of claim 1, wherein the carbon-containing material is coal.

3. The method of claim 2, wherein the coal is sub-bituminous coal or lignite.

4. The method of claim 1, wherein the carbon-containing material is a carbon-containing lignin waste material.

5. The method of claim 4, wherein the carbon-containing lignin waste material is selected from the group consisting of waste wood boards, wood chips, wood pellets, wood bricks, palm husks, and coconut husks.

6. The method of claim 1, the carbon-containing material is rubber tire pellets.

7. The method of claim 1, wherein the inert gas is nitrogen or argon.

8. The method of claim 1, wherein the carbon-containing material is subjected to the inert gas at a pressure of 1-1.5 atm.

9. The method of claim 1, wherein the heating process controlled to increase the temperature at a rate of 5-30° C./min.

10. The method of claim 9, wherein the carbon-containing material is sub-bituminous coal or lignite.

11. The method of claim 10, wherein the heating step includes sequentially holding the temperature at 200-240° C. for 35-45 minutes, holding the temperature at each of 260-300° C., 320-360° C., and 380-420° C. for 25-35 minutes, and holding the temperature at 550-900° C. for 30-90 minutes.

12. The method of claim 9, wherein the carbon-containing material is a carbon-containing lignin waste material selected from the group consisting of waste wood boards, wood chips, wood pellets, wood bricks, palm husks, and coconut husks.

13. The method of claim 12, wherein the heating step includes sequentially holding the temperature at 160-240° C. for 25-35 minutes, holding the temperature at each of 260-300° C. and 320-340° C. for 45-60 minutes, and holding the temperature at 360-500° C. for 25-60 minutes.

14. The method of claim 9, wherein the carbon-containing material is subjected to the inert gas, which is nitrogen or argon, at a pressure of 1-1.5 atm.

15. The method of claim 14, wherein the carbon-containing material is sub-bituminous coal or lignite, and the heating step includes sequentially holding the temperature at 200-240° C. for 35-45 minutes, holding the temperature at each of 260-300° C., 320-360° C., and 380-420° C. for 25-35 minutes, and holding the temperature at 550-900° C. for 30-90 minutes.

16. The method of claim 14, wherein the carbon-containing material is a carbon-containing lignin waste material selected from the group consisting of waste wood boards, wood chips, wood pellets, wood bricks, palm husks, and coconut husks; and the heating step includes sequentially holding the temperature at 160-240° C. for 25-35 minutes, holding the temperature at each of 260-300° C. and 320-340° C. for 45-60 minutes, and holding the temperature at 360-500° C. for 25-60 minutes.

17. The method of claim 1, wherein the carbon-containing material, being sub-bituminous coal or lignite, is subjected to the inert gas, which is nitrogen or argon, at a pressure of 1-1.5 atm; the heating process is controlled to increase the temperature at 5-30° C./min; and the heating step includes sequentially holding the temperature at 200-240° C. for 35-45 minutes, holding the temperature at each of 260-300° C., 320-360° C., and 380-420° C. for 25-35 minutes, and holding the temperature at 550-900° C. for 30-90 minutes.

18. The method of claim 1, wherein the weight percentage of the carbon in the treated carbon-containing material is increased by 25% or higher, as compared to the untreated carbon-containing material.

19. The method of claim 1, wherein the untreated carbon-containing material has a carbon content of 50 wt % or lower, a sulfur content of 0.9 wt % or higher, and a heat value of 5000 kcal/kg or lower; and the treated carbon-containing material has a carbon content of 70 wt % or higher, a sulfur content of 0.4 wt % or lower, and a heat value of 7000 kcal/kg or higher.

20. The method of claim 17, wherein the untreated carbon-containing material has a carbon content of 50 wt % or lower, a sulfur content of 0.9 wt % or higher, and a heat value of 5000 kcal/kg or lower; and the treated carbon-containing material has a carbon content of 70 wt % or higher, a sulfur content of 0.4 wt % or lower, and a heat value of 7000 kcal/kg or higher.

* * * * *